United States Patent [19]

Allart et al.

[11] Patent Number: 5,001,964
[45] Date of Patent: Mar. 26, 1991

[54] PRESSURIZED FLUID MECHANISM WITH TWO CUBIC CAPACITIES AND CLOSED CIRCUIT APPLYING SAME

[75] Inventors: Bernard Allart, Crepy en Valois; Louis Bigo, Compienge, both of France

[73] Assignee: Poclain Hydraulics, France

[21] Appl. No.: 422,110

[22] Filed: Oct. 16, 1989

[30] Foreign Application Priority Data

Oct. 19, 1988 [FR] France .................. 88 13762

[51] Int. Cl.[5] ........................................... F15B 13/09
[52] U.S. Cl. ............................ 91/519; 60/420; 60/427; 60/483
[58] Field of Search .............. 91/519; 60/420, 427, 60/483

[56] References Cited

U.S. PATENT DOCUMENTS

| | | | |
|---|---|---|---|
| 3,266,436 | 8/1966 | Yarger | 60/483 |
| 4,121,501 | 10/1978 | Finley | 91/519 |
| 4,293,000 | 10/1981 | Budzich | 60/427 |
| 4,807,519 | 2/1989 | Wusthof et al. | 91/519 |

FOREIGN PATENT DOCUMENTS

| | | |
|---|---|---|
| A2292877 | 6/1976 | France . |
| A2481755 | 11/1981 | France . |
| A2168436 | 6/1986 | United Kingdom . |

Primary Examiner—Ronald C. Capossela
Attorney, Agent, or Firm—Brumbaugh, Graves, Donohue & Raymond

[57] ABSTRACT

The present invention relates to a hydraulic motor capable of presenting two active cubic capacities of different values, as described in FR-A-2 481 755, and comprising in particular a shuttle valve presenting an inner conduit, wherein a bleeding conduit is arranged in the member for selecting the cubic capacity and communicates with the inner conduit of the shuttle valve, which it connects to an evacuation, while a calibrated restriction is disposed in the bleeding conduit. One application is the production of refrigeration of the hydaulic fluid for supplying this mechanism in closed circuit.

5 Claims, 9 Drawing Sheets

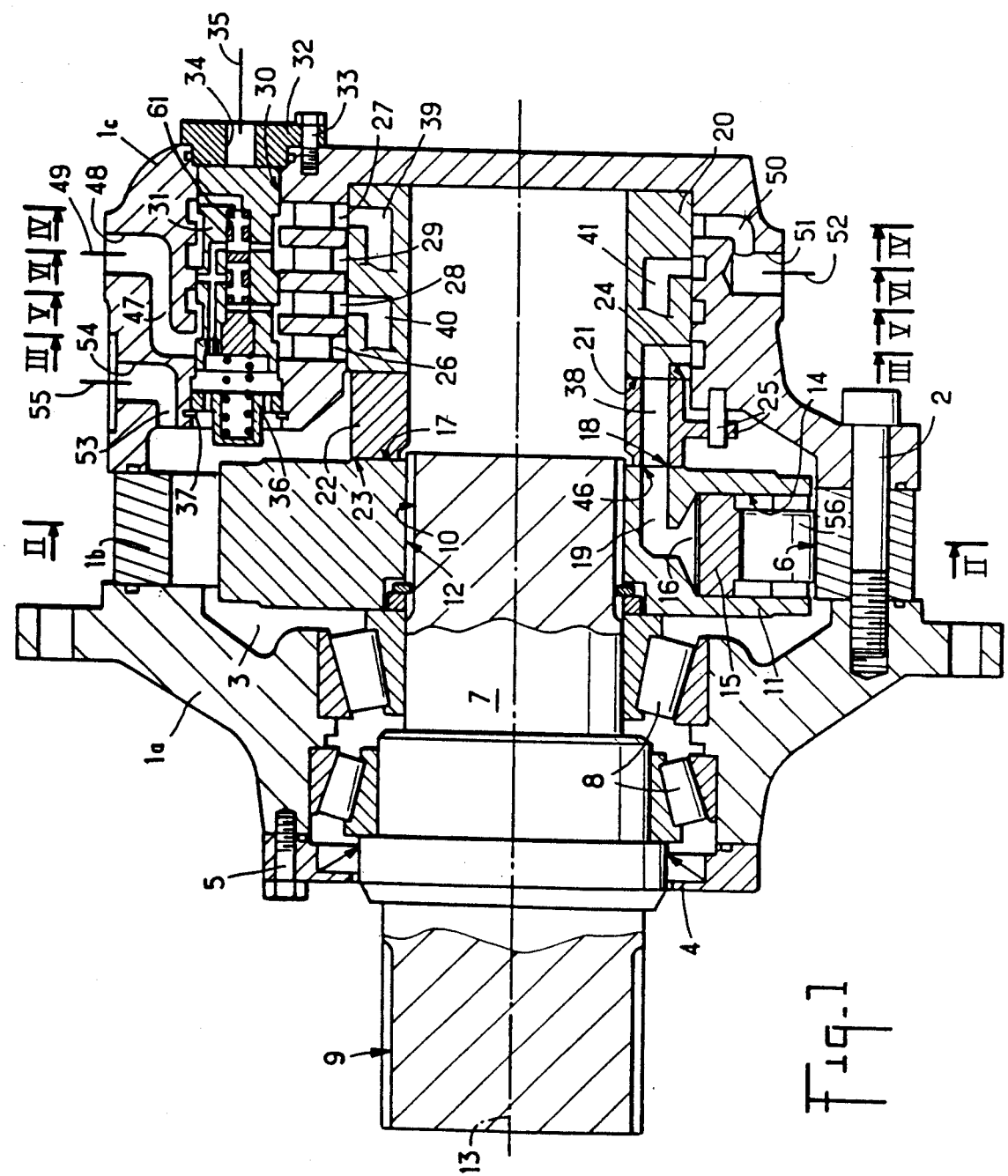

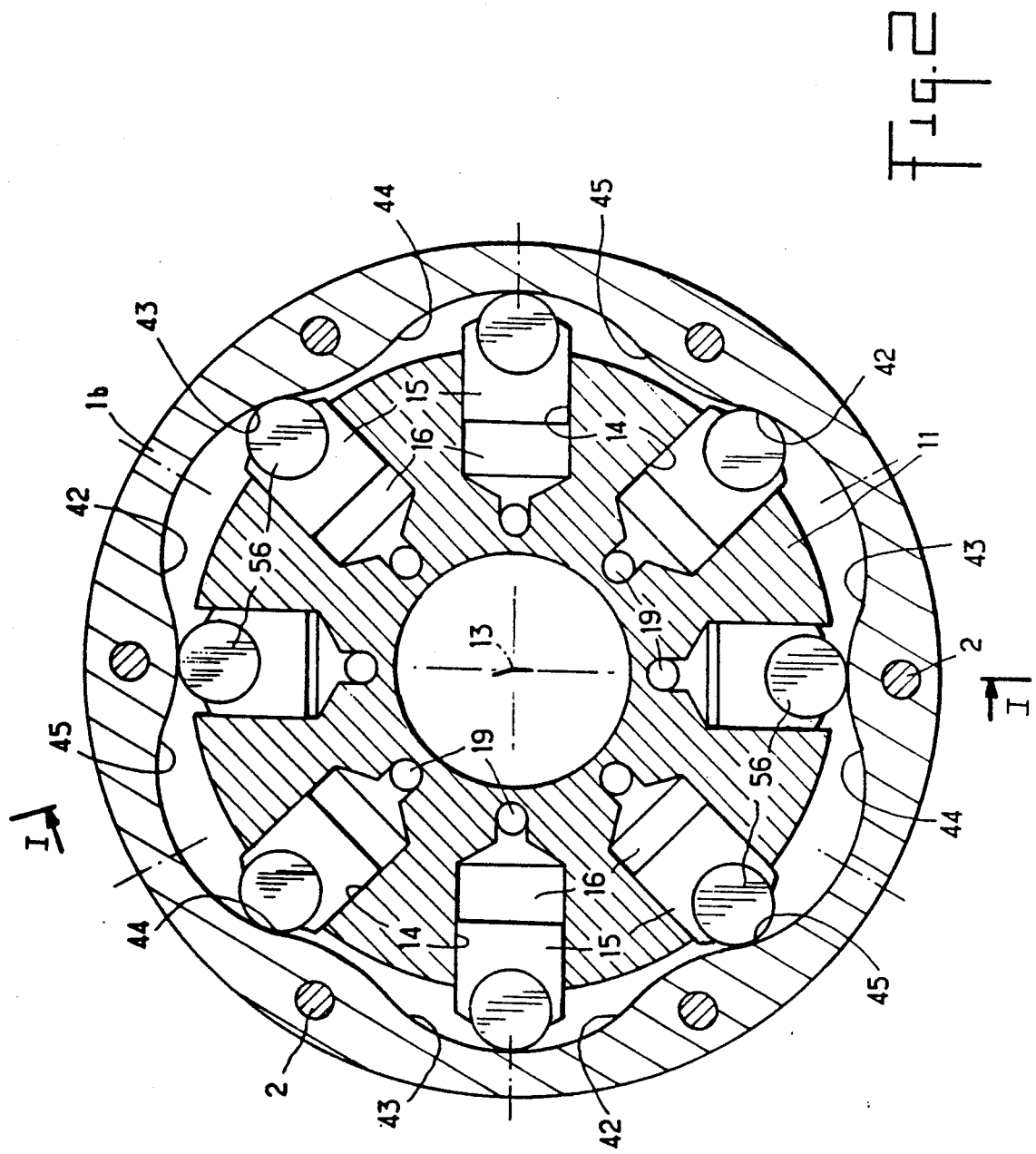

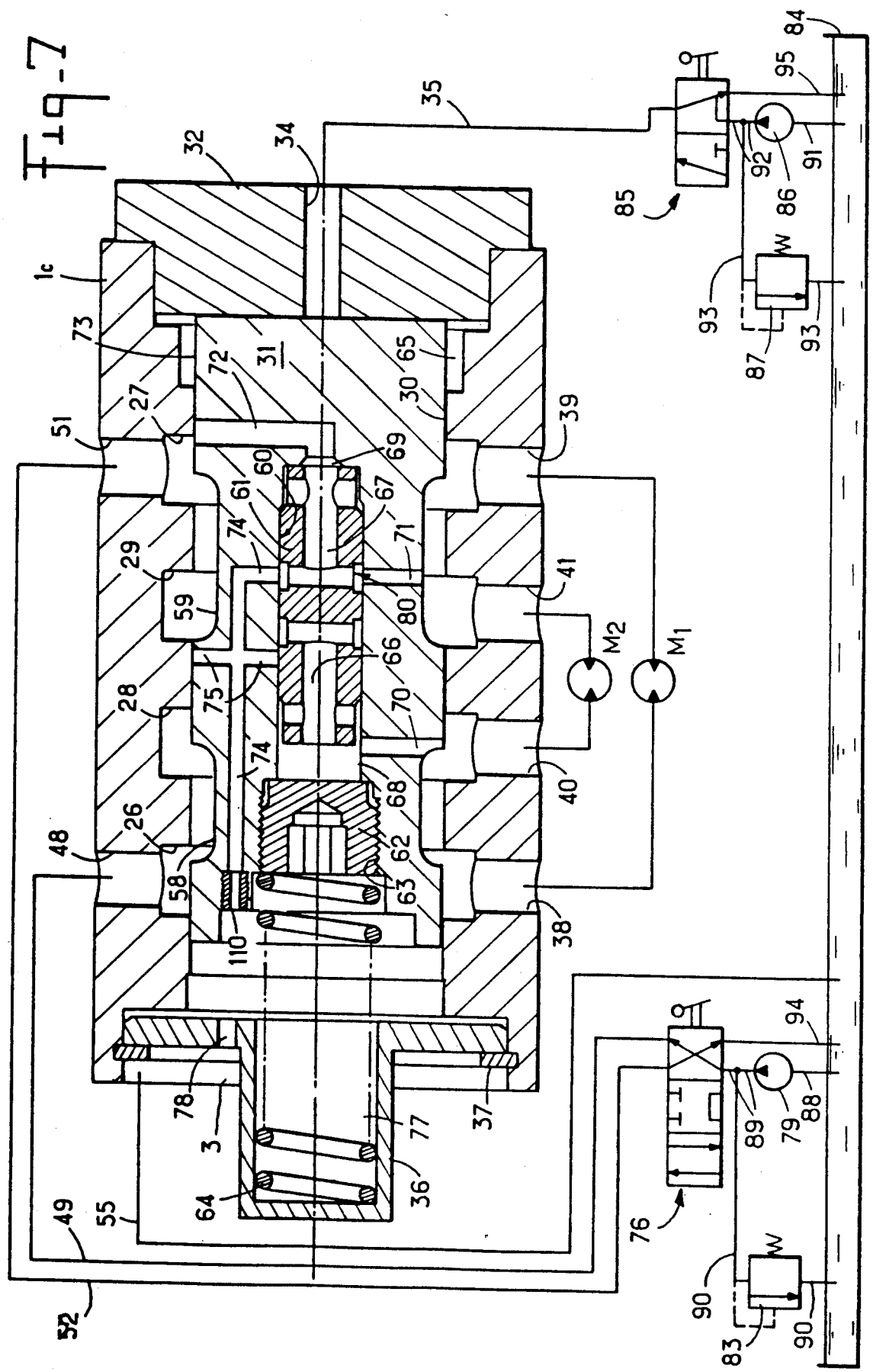

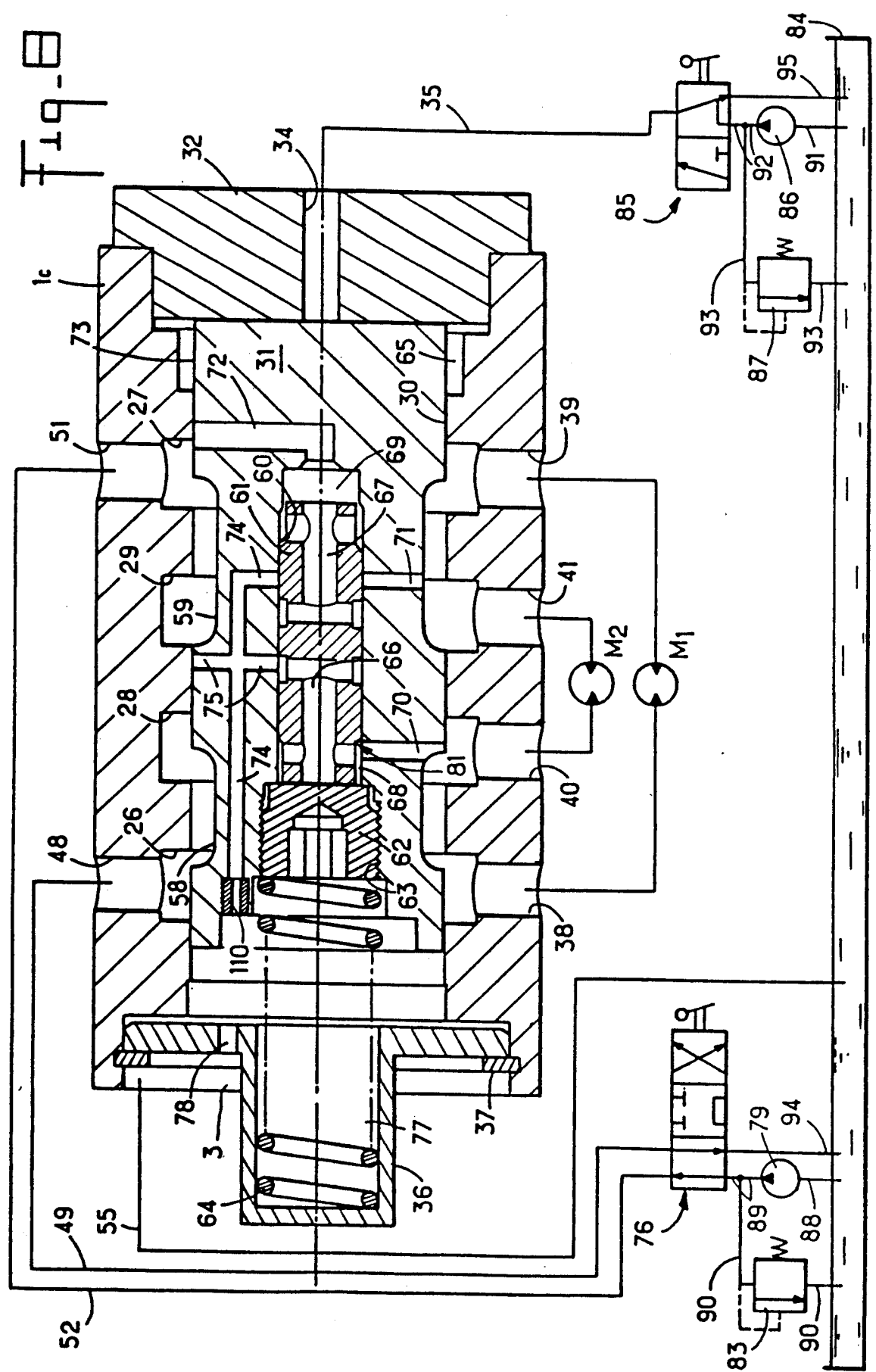

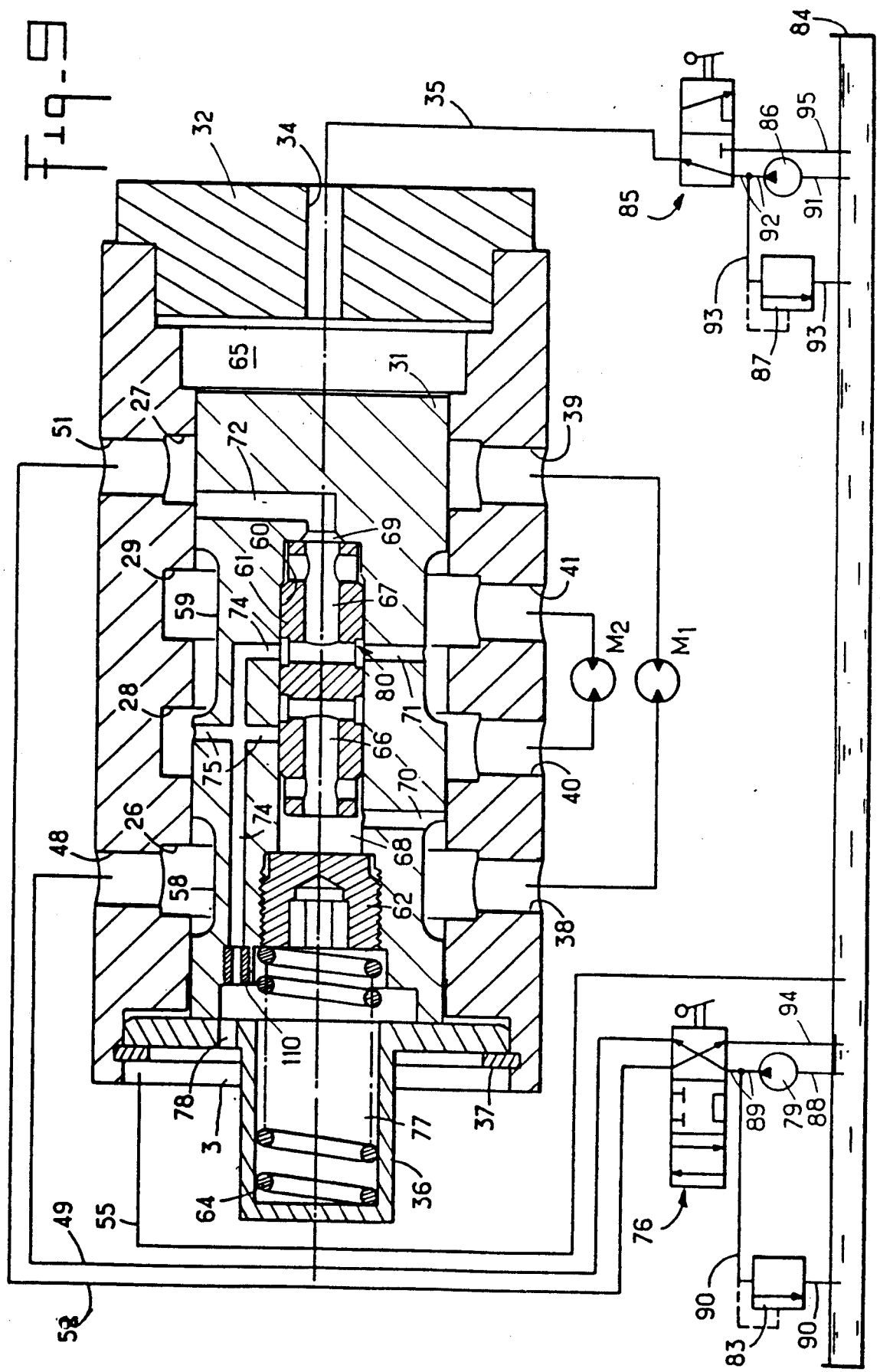

PRESSURIZED FLUID MECHANISM WITH TWO CUBIC CAPACITIES AND CLOSED CIRCUIT APPLYING SAME

FIELD OF THE INVENTION

The present invention relates to a pressurized fluid mechanism with two cubic capacities and to a closed circuit applying same.

BACKGROUND OF THE INVENTION

Patent FR-A-2 481 755 describes a hydraulic motor capable of having two active cubic capacities of different values.

Such a motor may have numerous applications and in particular be supplied in closed circuit. Such closed circuits must generally be provided with devices for refrigerating the hydraulic fluid used. The invention defines a simple arrangement making it possible to obtain refrigeration of said hydraulic fluid.

It should be noted that, although the invention originally relates to the application of the above-mentioned motor to its supply in closed circuit, this invention may have other applications and is therefore more generally relative to the device complementary to the known motor which allows part of the supply fluid of the motor to be taken for any desired subsequent use of the fluid bled. This bled fluid may, in the case of a closed circuit supply, be refrigerated, then remixed with the rest of the fluid, but may, on the contrary, in the case of an open circuit, also be heated in order to bring the various constituents of a circuit, including the hydraulic motor itself, to the correct operational temperature more rapidly, or even to serve to irrigate elements, momentarily non-active, of hydraulic motors.

SUMMARY OF THE INVENTION

The invention therefore firstly relates to a pressurized fluid mechanism, motor or pump, comprising two principal connections capable of being connected, one to an enclosure containing a high-pressure fluid, the other to an enclosure containing a low-pressure fluid, and vice versa; a cam with a plurality of successive curves, which are distributed in a first and a second distinct group of curves; a plurality of cylinders, which are arranged in a cylinder block mounted to rotate with respect to said cam; a plurality of pistons, which are mounted to slide in said cylinders, at least one piston per cylinder, and which abut on said cam; an inner fluid distributor comprising as many pairs of first and second distribution conduits as there are curves on the cam, said pairs of distribution conduits being distributed in two distinct groups of pairs of a first and a second distribution conduit, each pair corresponding to one of said curves of the cam; a member for selecting the cubic capacity, which is capable of being placed in two distinct positions, a first position in which the first distribution conduits of said two groups of distribution conduits are connected to the first principal connection and in which the second distribution conduits of said two groups are connected to the second principal connection, and the second position, in which the first distribution conduits of the first group of distribution conduits are connected to the first principal connection, the second distribution conduits of the first group of distribution conduits are connected to the second principal connection, and the first and second distribution conduits of the second group of distribution conduits are connected together; a shuttle valve which is mounted to move in a housing made in said member for selecting the cubic capacity, which comprises two opposite faces permanently subjected, when said cubic capacity selection member is placed in said second position, one to the effect of the pressure of the fluid contained in the first principal connection, the other to the effect of the pressure of the fluid contained in the second principal connection, these effects being antagonistic and their resultant being capable of placing the shuttle valve in one or the other of two extreme positions inside said housing, whilst, when the cubic capacity selection member is placed in its second position, said shuttle valve establishes communication, by means of at least one conduit inside said shuttle valve and at least one conduit inside the cubic capacity selection member which then communicates on the one hand with the inner conduit of the shuttle valve, on the other hand with that of the first and second principal connections capable of containing the low-pressure fluid, (said shuttle valve establishes communication) between said first and second distribution conduits of said second group of distribution conduits and said principal connection capable of containing the low-pressure fluid.

According to the invention, a bleeding conduit is arranged at least partially in said cubic capacity selection member and communicates with said inner conduit of the shuttle valve, which it connects to a fluid evacuation via a calibrated restriction.

The following advantageous arrangements are also preferably adopted:

the shuttle valve comprises two inner conduits which are connected, one, in the first position of the shuttle valve, the other, in the second position of the shuttle valve, to said principal connection capable of containing the low-pressure fluid, whilst the bleeding conduit comprises two branches which communicate, one, in the first position of the shuttle valve, with one of the said two inner conduits of the shuttle valve, the other, in the second position of the shuttle valve, with the other of said two inner conduits of the shuttle valve;

the bleeding conduit opens out into a housing that the motor comprises.

The invention also relates to a closed circuit for pressurized fluid supply of a mechanism having at least two cubic capacities as defined hereinbefore and which comprises a reservoir of fluid, to which the housing of said mechanism is connected by an evacuation conduit, as well as a booster pump, which comprises a suction conduit and a delivery conduit and which is connected to said reservoir by its suction conduit, a heat exchanger whose function is to refrigerate the fluid sucked by said booster pump, being placed on one of said suction and delivery conduits of the booster pump.

The principal advantage of the mechanism according to the invention resides in its simplicity, the modification made with respect to the prior known mechanism being materially small, although its efficiency is great.

BRIEF DESCRIPTION OF THE DRAWINGS

The invention will be more readily understood on reading the following description with reference to the accompanying drawings, in which:

FIG. 1 is an axial section along I—I of FIG. 2 of a mechanism according to the invention.

FIG. 2 is a transverse section along II—II of FIG. 1.

FIGS. 7, 8, 9 and 10 represent a supply circuit for the mechanism of FIGS. 1 and 2, corresponding respectively to four distinct operational configurations.

DETAILED DESCRIPTION OF THE DRAWINGS

Figure 4:
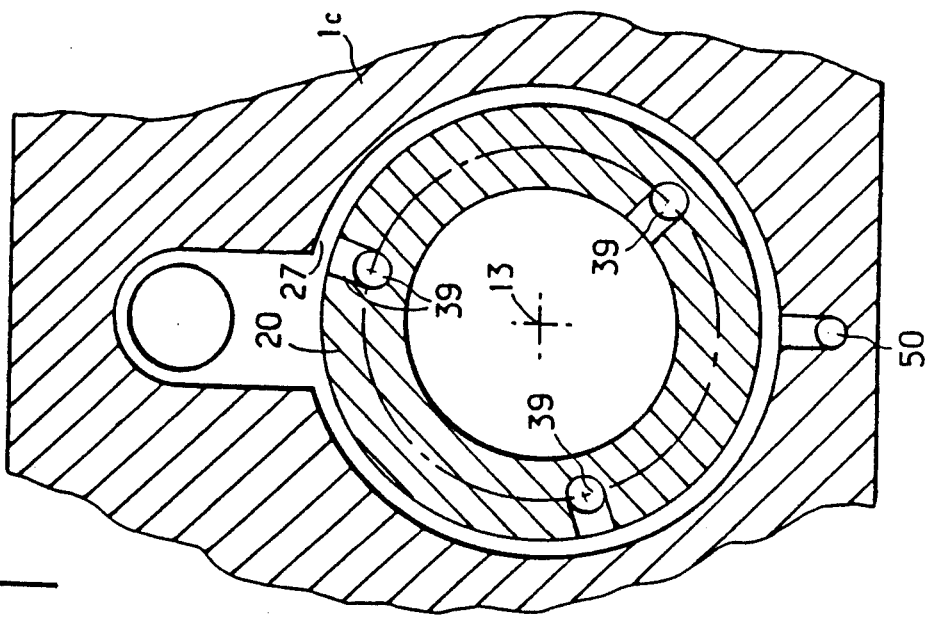
FIGS. 3, 4, 5 and 6 are sections along III—III, IV—IV, V—V and VI—VI, respectively, of FIG. 1.
Figure 3:
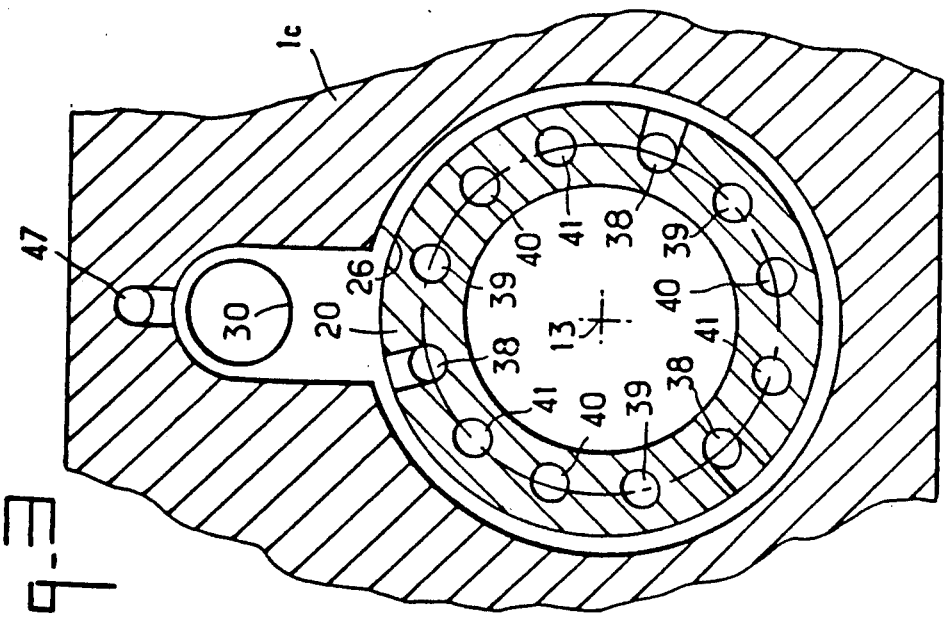
Figure 6:
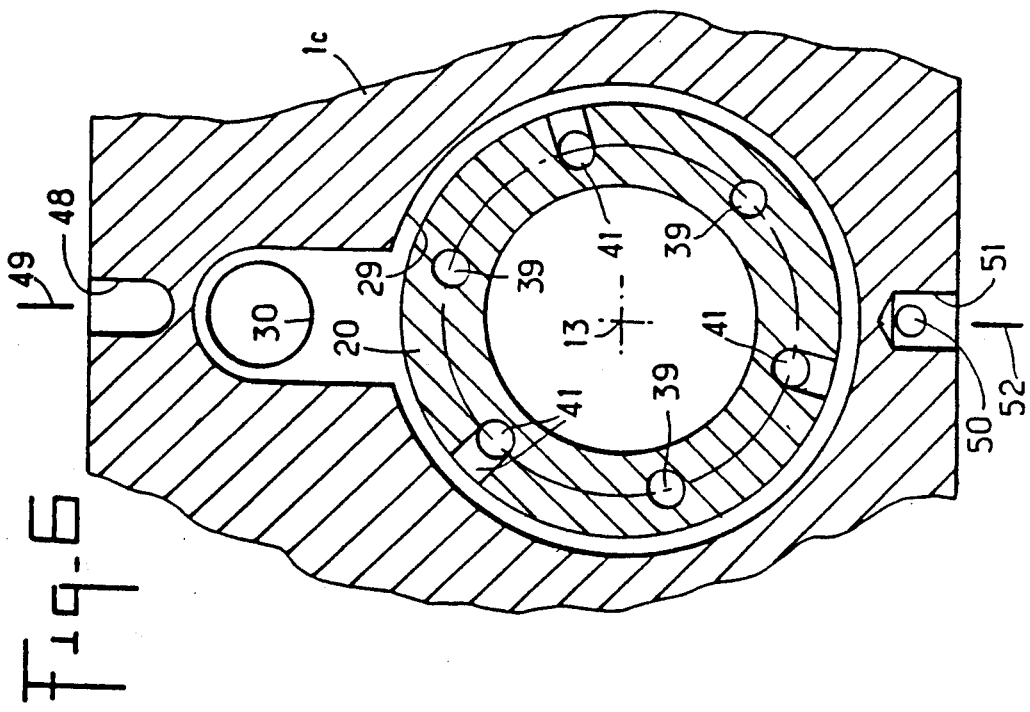
Figure 5:
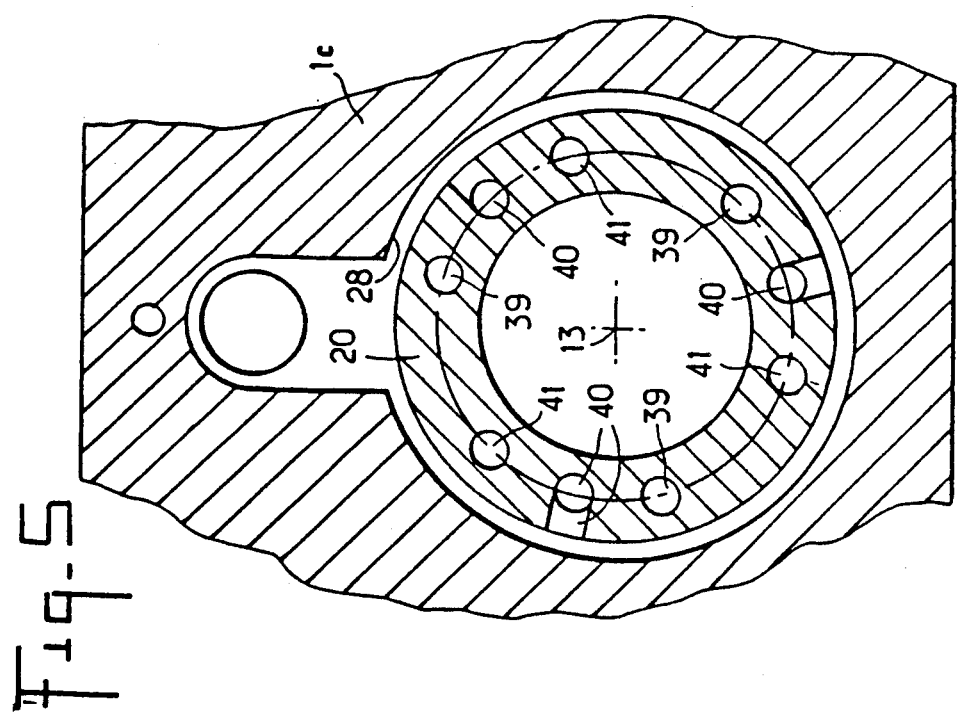

Referring now to the drawings, the motor shown in FIGS. 1 to 6 is constituted by:

a housing comprising three parts 1a, 1b and 1c assembled together by bolts 2, this housing defining an enclosure 3 closed by an obturation plate 4 fixed on part 1a by screws 5;

the inner face 6 of the intermediate part 1b of the housing forms an undulatory cam;

a driven shaft (driving shaft) 7, which is mounted to rotate with respect to the housing, about a geometrical axis 13, by means of rotation bearings 8, and comprising outer grooves 9 which allow coupling thereof to an element having to be driven, and inner grooves 10;

a cylinder block 11 which comprises grooves 12 co-operating with the inner grooves 10 of the driven shaft 7 to connect these two pieces in rotation;

a plurality of cylinders 14, disposed radially in the cylinder block 11 and regularly spaced angularly about axis 13;

pistons 15 mounted to slide in said cylinders, one piston per cylinder, defining with corresponding cylinder 14 a work chamber 16 and in abutment on the cam 6 via a cylindrical roller 56;

a flat face 17 of the cylinder block perpendicular to axis 13, in which open out, via orifices 18, conduits 19 connecting, each conduit 19, the work chamber 16 of a cylinder to said flat face 17;

an inner sheath 20 which is fast with part 1c of the housing and which comprises a flat face 21 perpendicular to axis 13;

an inner fluid distributor 22, shaped as a sort of thick disc defined by two flat faces 23 and 24 perpendicular to axis 13 and in contact with the flat faces 17 of the cylinder block 11 and 21 of the sheath 20, respectively, this inner fluid distributor 22 being, in addition, immobilized in rotation with respect, part 1c of the housing by means of an assembly 25 of catches and notches;

opposite the sheath 20, four circular grooves 26, 27, 28 and 29 are made in part 1c of the housing and open out on the outer periphery of the sheath disposed opposite;

a bore 30 is made in part 1c of the housing and contains a slide valve 31 for selecting the cubic capacity, which is mounted to slide therein, this bore 30 being outwardly closed by a stopper 32 fixed on part 1 of the housing by screws 33 and being traversed by the connection 34 of an outer conduit 35 and being inwardly closed by a cap 36 maintained by a stop element 37;

six pairs of inner conduits corresponding to the six complete curves that cam 6 comprises, made in the sheath 20 and the inner distributor 22, and connecting grooves 26 to 29 to the flat face 23 of the inner distributor 22, viz.

three conduits 38, connected to groove 26, and corresponding to the first ramps 42 of three of the six curves;

three conduits 39, connected to groove 27, and corresponding to the second ramps 43 of the same three curves;

three conduits 40, connected to groove 28, and corresponding to the first ramps 44 of the last three curves; and three conduits 41, connected to groove 29 and corresponding to the second ramps 45 of these last three curves, ramps 42, 43, 44 and 45 together constituting cam 6;

conduits 38, 39, 40, 41 opening out in the flat face 23 via orifices 46 disposed so as to be in communication successively with the various orifices 18 of the flat face 17 of the cylinder block;

groove 26 communicates, via a conduit 47, inside part 1c of the housing, with the connection 48 of an outer conduit 49;

groove 27 communicates, via a conduit 50, inside part 1c of the housing, with the connection 51 of an outer conduit 52;

enclosure 3 of the housing is connected, by a conduit 53, inside part 1c of the housing, with the connection 54 of an outer conduit 55.

FIGS. 7 to 10 show that part of the motor containing the slide valve 31 for selecting the cubic capacity, on a large scale, and, schematically, the circuit for pressurized fluid supply of this motor.

Figure 10:
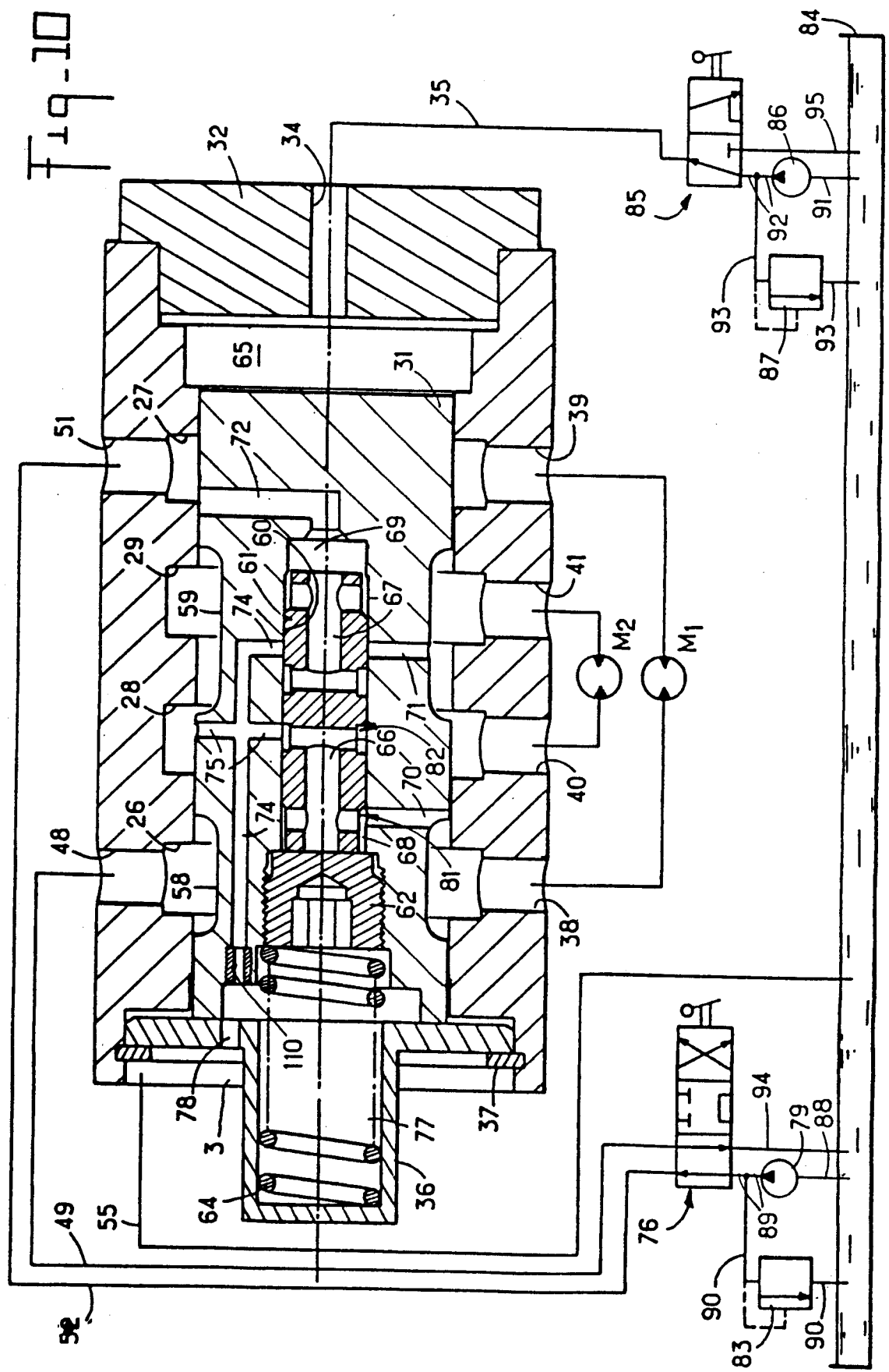

The slide valve 31 for selecting the cubic capacity comprises two grooves 58 and 59, which, in the first position of this slide valve 31 (FIGS. 7 and 8), place in communication groove 58, grooves 26 and 28 of part 1c of the housing and groove 59, grooves 27 and 29 of part 1c of the housing, whilst, in the second position of the slide valve 31 for selecting the cubic capacity (FIGS. 9 and 10), groove 58 communicates only with groove 26 and groove 59 places in communication grooves 28 and 29, groove 27 remaining isolated from grooves 26, 28 and 29. This slide valve 31 comprises a central bore 60 which contains a shuttle valve 61 mounted to slide inside this bore and which is obturated by a stopper 62 screwed in a tapping 63. A spring 64 is disposed between the cap 36 and the stopper 62 and has an effect antagonistic of that of the pressure of the fluid contained in an end chamber 65 defined by part 1c of the housing, one end of the slide valve 31 for selecting the cubic capacity and the stopper 32. When the effect of the spring 64 is predominant, the slide valve 31 for selecting the cubic capacity is placed in its first position (FIGS. 7 and 8); when, on the contrary, the pressure of the fluid contained in the camber 65 is predominant, the slide valve 31 for selecting the cubic capacity is placed in its second position (FIGS. 9 and 10). The shuttle valve 61 comprises two distinct inner enclosures 66 and 67 and defines in the bore 60 two end chambers 68 and 69, whilst the slide valve 31 for selecting the cubic capacity comprises the following conduits: a conduit 70 connecting groove 58 to bore 60, permanently opening out in the end chamber 68; a conduit 71 connecting groove 59 to bore 60; a conduit 72 connecting the end chamber 69 to the cylindrical face 73 of the slide valve 31; a conduit 74 which opens out in bore 60, which it connects, via a calibrated restriction 110, to a chamber 77 defined by the interior of the bore 30, the end of the slide valve 31 for selecting the cubic capacity which is provided with stopper 62 and cap 36, said chamber 77 communicating with the enclosure 3 of the housing via orifices 78; and a conduit 75, which opens out in the cylindrical face 73 and in the bore 60 and is connected to conduit 74. Inside the bore 60, the shuttle valve 61 may occupy a first extreme position (FIGS. 7 and 9) in which the volume of the chamber 68 is maximum, and a second extreme position (FIGS. 8 and 10) in which it is, on the contrary, the volume of the chamber 69 which is maximum. In the first extreme position of the shuttle valve 61 (FIGS. 7 and 9), the conduit 72 and the conduit 71, via a groove 80 of the shuttle valve, communicate with enclosure 67 and conduit 74, which conduit 74 also communicates with this groove 80. In the second position of the slide valve 31 for selecting the cubic capacity (FIGS. 9 and 10), conduit 72 opens out in groove 27. In the second extreme position of the shuttle valve 61 (FIGS. 8 and 10), conduit 70 communicates with a groove 81 of the shuttle valve in which opens out the enclosure 66. It may be observed that, when the slide valve 31 for selecting the cubic capacity is placed in its second position, either (FIG. 9) the fluid contained in groove 26 and in chamber 68 has pushed the shuttle valve 61 towards the right and therefore has a pressure greater than that of the fluid contained in the chamber 69 and in the groove 27, and the grooves 28 and 29 then contain the fluid at the lowest pressure (grooves 28 and 29, groove 59, conduit 71, enclosure 67, conduit 72), or (FIG. 10), the fluid contained in groove 27 and in chamber 69 has pushed the shuttle valve 61 towards the left and therefore has a pressure greater than that of the fluid contained in chamber 68 and in groove 26, and grooves 28 and 29 then contain the fluid at the lowest pressure (grooves 26 and 58, conduit 70, enclosure 66, groove 82 in which conduit 75 opens out, conduit 75). In both cases, grooves 28 and 29 contain the fluid at the lowest pressure.

In any case, one of conduits 74 and 75 communicates with that of enclosures 66 and 67 containing the fluid at the lowest pressure.

In this way, in the configuration of FIG. 7, the shuttle valve 61 is pushed towards the right, chamber 69 containing the fluid at the lowest pressure, the same as that contained in enclosure 67 and in grooves 59, 27 and 29: conduit 74 effectively communicates with enclosure 67.

In the configuration of FIG. 8, the shuttle valve 61 is pushed towards the left, chamber 68 containing the fluid at the lowest pressure, the same as that contained in enclosure 66: conduit 75 communicates with this enclosure 66.

In the configuration of FIG. 9, the shuttle valve 61 is pushed towards the right, chamber 69 containing the fluid at the lowest pressure, the same as that contained in enclosure 67: conduit 74 communicates with enclosure 67.

Finally, in the configuration of FIG. 10, the shuttle valve 61 is pushed towards the left, chamber 68 containing the fluid at the lowest pressure, the same as that contained in enclosure 66: conduit 75 communicates with this enclosure 66.

The fluid contained in conduit 74 pours into chamber 77, through the calibrated restriction 110, advantageously made in the form of a removable calibrated nozzle, then pours into enclosure 3 of the housing via the or each orifice 78.

The pistons which are in abutment on the ramps 42 and 43 displace a volume of fluid corresponding to a first cubic capacity C1, whilst those which are in abutment on ramps 44 and 45 displace a volume of fluid corresponding to a cubic capacity C2. These cubic capacities C1, C2 are shown schematically in FIGS. 7 to 9 in the form of two motors M1, M2, respectively.

A supply circuit of the complete motor is shown in FIGS. 7 to 10 and comprises:
 a three-position distributor 76;
 a principal pump 79;
 a calibrated discharge valve 83;
 a fluid reservoir 84;
 a two-position distributor 85 for selecting the cubic capacity;
 an auxiliary pump 86;
 a calibrated discharge valve 87.

The following conduits connect the different elements:
 the suction conduit 88 of the principal pump 79 connects the latter to the reservoir 84;
 the delivery conduit 89 of the principal pump 79 connects the latter to the three-position distributor 76;
 a conduit 90 connects the delivery conduit 89 to the reservoir 84, the discharge valve 83 being placed in this conduit 90;
 conduits 49 and 52, which are connected to the three-position distributor 76;
 conduit 55 is connected to reservoir 84;
 the suction conduit 91 of the auxiliary pump 86 connects the latter to reservoir 84;
 the delivery conduit 92 of the auxiliary pump 86 connects the latter to the two-position distributor 85;
 a conduit 93 connects the delivery conduit 92 to reservoir 84, the discharge valve 87 being placed in this conduit 93;
 conduits 94 and 95 connect distributors 76 and 85 respectively, to reservoir 84.

The three positions of distributor 76 correspond as follows:
 the first position (FIGS. 7 and 9), to the communications of conduits 49 and 89, and of conduits 52 and 94;
 the second position, to the obturation of conduits 49 and 52 and to the communication of conduits 89 and 94; and
 the third position (FIGS. 8 and 10), to the communications of conduits 52 and 89 and of conduits 49 and 94.

The two positions of distributor 85 correspond as follows:
 the first position (FIGS. 7 and 8), to the communication of conduits 35, 92 and 95; and
 the second position (FIGS. 9 and 10), to the communication of conduits 35 and 92 and to the obturation of conduit 95.

Figure 11:
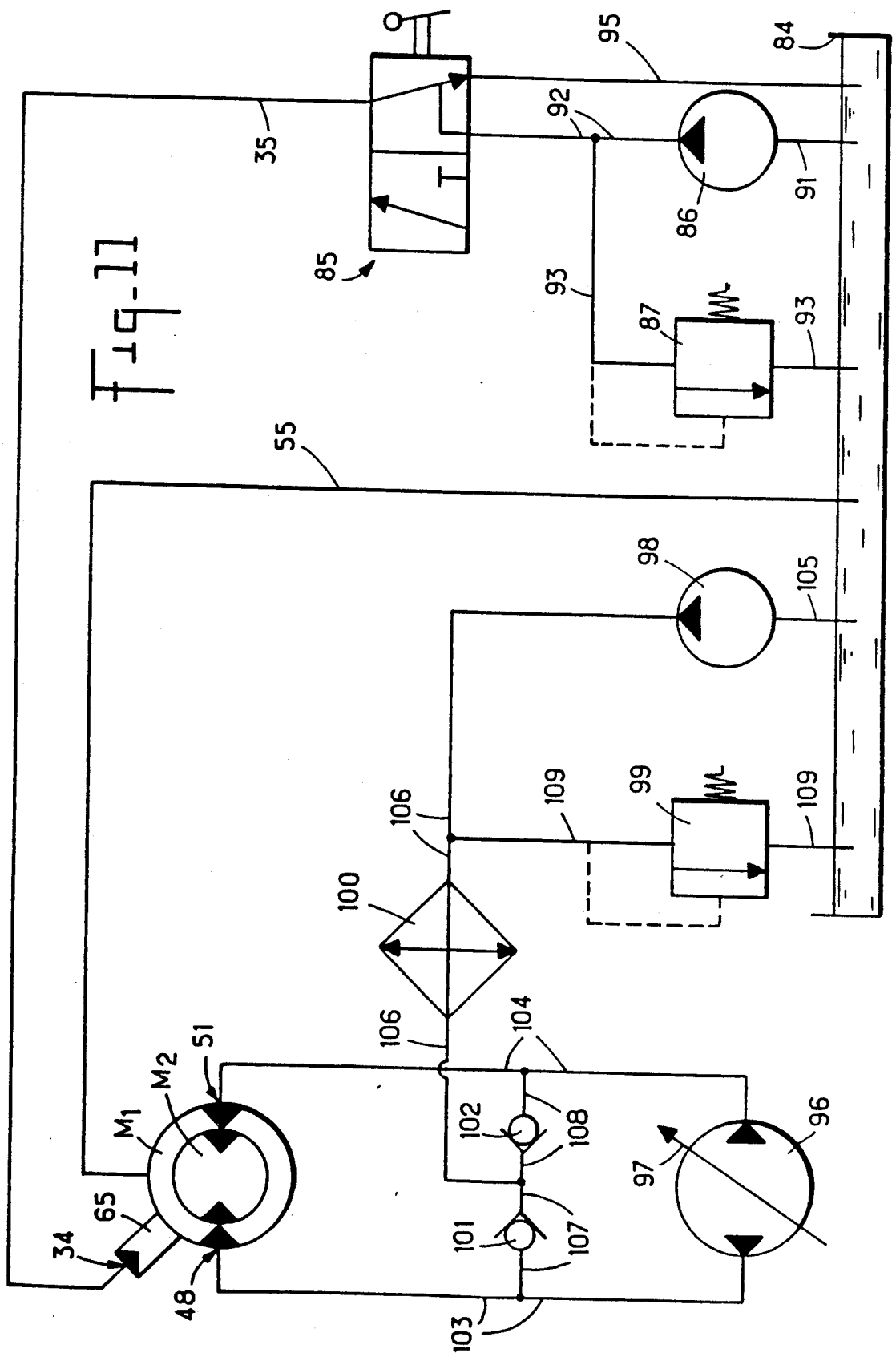
FIG. 11 shows another supply circuit, also according to the invention, or the same mechanism of FIGS. 1 and 2.

FIG. 11 shows another circuit for supplying the motor of FIG. 1, which comprises:
 the two-position distributor 85, the auxiliary pump 86, the discharge valve 87, the reservoir 84, and conduits 35, 91, 92, 93, 95 and 55 already defined;
 a principal pump 96 with continuously variable flow-rate (inclinable plate 97);
 a booster pump 98;
 a calibrated discharge valve 99;
 a heat exchanger 100, performing the function of fluid refrigerant;
 two non-return valves 101 and 102.

The following conduits connect these different elements:
 conduits 103 and 104 connect the two principal connections of pump 96 to the connections 48 and 51 of the motor, respectively;
 the suction conduit 105 of the booster pump 98 connects the latter to reservoir 84;
 delivery conduit 106 of the booster pump 98 connects the latter to two conduits 107 and 108 which are themselves connected to each other and one, 107, to conduit 103, the other, 108, to conduit 104, the refrigerant exchanger 100 being placed on the delivery conduit 106, the non-return valve 101 being placed in conduit 107 so as to allow the fluid to pass only from conduit 106 towards conduit 103, and the non-return valve 102 being placed in conduit 108 so as to allow the fluid to pass only from conduit 106 towards conduit 104;

a conduit 109, which connects conduit 106 to reservoir 84 and in which the discharge valve 99 is placed.

Operation of the circuit shown in FIGS. 7 to 10 will now be described.

The three-position distributor 76 serves only to reverse the direction of supply of the motor, therefore to control reversal of the direction of rotation of the driven shaft 7, or to maintain the motor in stop position. It is now assumed that this distributor 76 is placed in its first position (FIGS. 7 and 9).

When the two-position distributor 85 is placed in its first position (FIG. 7), the action of spring 64 is predominant and the slide valve 31 isolates groove 28 from groove 29, but, on the contrary, places in communication grooves 26 and 28 and grooves 27 and 29. Motors M1 and M2 are supplied in parallel, the total cubic capacity of the complete motor being equal to (C1 and C2). Part of the low-pressure fluid contained in groove 59 is bled through conduit 74, is poured into enclosure 3 and is evacuated through conduit 55. In the example shown, this bled fluid returns to reservoir 84, but it may be directed towards another destination: for example, traverse a refrigeration exchanger such as the one (100) of FIG. 11, or, on the contrary, traverse the housing of another motor to heat said other motor. As bleeding of fluid was effected on the fluid at the lowest of pressures, and, in addition, as the quantity bled off represents only part of this fluid at the lowest of pressures (restriction 78), the loss of energy provoked by such bleeding is small.

When the two-position distributor 85 is placed in the second position (FIG. 9), the action of the pressure of the fluid contained in the chamber 65 is predominant: the slide valve 31 isolates each of grooves 26 and 27, and places in communication grooves 28 and 29. Only motor M1 is supplied by the fluid delivered by the pump 79, the working cubic capacity of the complete motor being equal to C1. The motor M2 is supplied by the fluid at the lowest of pressures (groove 27, conduit 72, enclosure 67, conduit 71 groove 59) and its supply and delivery pressures (grooves 28 and 29) are equal. A certain quantity of fluid at the lowest of pressures continues to be bled through conduit 74 to be treated as described hereinbefore.

The circuit of FIG. 11 functions as described hereinafter:

The inclination of plate 97 of pump 96 makes it possible to deliver the fluid under pressure either towards conduit 103, towards conduit 104, or towards neither of the two, and to adjust the flowrate of the delivered fluid. The two-position distributor 85 allows the selection of the cubic capacity (C1+C2, or only C1) of the motor and the bled fluid returns to reservoir 84 via conduit 55.

Pump 96 and motor (M1+M2) are connected in closed circuit (conduits 103 and 104). If, in such a circuit, in addition to the usual leakages, part of the fluid is bled off, it is necessary to replace the bled-off fluid. The precise function of the booster pump 98 is to reintroduce, in that of conduits 103 and 104 which contains the low-pressure fluid, a quantity of fluid equal to that which was bled off.

In the case of the circuit of FIG. 11, when a motor is supplied in closed circuit, it is known that the fluid finishes by heating up. This is the reason for which, on the one hand, a certain quantity of this fluid is bled off (conduit 55), and, on the other hand, before being reintroduced in the closed circuit (conduits 103, 104), this quantity of fluid is refrigerated by passing through the heat exchanger 100.

The invention is not limited to the embodiments shown, but covers, on the contrary, all the variants which may be made thereto without departing from the scope nor spirit thereof.

What is claimed is:

1. A pressurized fluid device comprising:

a first principal connection (48) and a second principal connection (51) capable of being connected, one to an enclosure containing a high-pressure fluid, the other to an enclosure containing a low-pressure fluid;

a cam with a plurality of successive curves, which are distributed in a first and a second distinct group of curves, each curve (42–43; 44–45) comprising a first ramp (42;44) and a second ramp (43;45);

a plurality of cylinders (14), which are arranged in a cylinder block (11) mounted to rotate with respect to said cam;

a plurality of pistons (15), which are mounted to slide in a radial direction in said cylinders, at least one piston per cylinder, which define within said cylinders work chambers (16) with said pistons (15) having abutment means on said cam (6);

an inner fluid distributor (22) comprising first distribution conduits (38,40) equal in number to the number of the curves of the cam (6) and corresponding to the possible abutment of a piston on said first ramp (42,44) of a curve, and second distribution conduits (39,41) equal in number to the number of the curves of the cam (6) and corresponding to the possible abutment of a piston on said second ramp (43,45) of a curve, said first and second distribution conduits being associated into paris (38–39; 40–41) of distribution conduits, each pair comprising one (38,40) of said first distribution conduit, and one (39,41) of said second distribution conduits with said pairs of distribution conduits being distributed in a first group and a second group of pairs of distribution conduits, with the pairs (38,39) of distribution conduits of said first group of pairs of distribution conduits corresponding to the curves (42–43) of said first group of curves and the pairs (40–41) of distribution conduits of said second group of pairs of distribution conduits corresponding to the curves (44–45) of said second group of curves;

a valve member (31) for selecting the cubic capacity, which is capable of being placed in two distinct positions, a first position (FIGS. 7 and 8) in which the first distribution conduits (38,40) of the pairs of said two groups of pairs of distribution conduits are connected to the first principal connection (48) and in which the second distribution conduits (39,41) of said pairs of said two groups of pairs of distribution conduits are connected to the second principal connection (51), and the second position (FIGS. 9 and 10), in which the first distribution conduits (38) of the pairs (38-39) of the first group of pairs of distribution conduits are connected to the first principal connection (48), the second distribution conduits (39) of the pairs (38,38) of the first group of pairs of distribution conduits are connected to the second principal connection (51), and the first (40) and second (41) distribution conduits of the pairs (40-41) of the second group of pairs of distribution conduits are connected together;

a shuttle valve (61) which is mounted to move in a housing within said valve member for selecting the cubic capacity (31), which comprises two opposite faces permanently subjected, when said cubic capacity selection member is placed in said second position, one to the effect of the pressure of the fluid contained in the first principal connection, the other to the effect of the pressure of the fluid contained in the second principal connection, these effects being opposite and their result being capable of placing the shuttle valve in one or the other of two extreme positions inside said housing, while, when the cubic capacity selection member is placed in its second position, said shuttle valve, by means of at least one conduit inside said shuttle valve and at least one conduit inside the cubic capacity selection member which then communicates with the inner conduit of the shuttle valve, and with that of the first and second principal connections capable of containing the low-pressure fluid, said shuttle valve establishes communication between said first and second distribution conduits of said second group of pairs of distribution conduits and said principal connection capable of containing the low-pressure fluid, wherein a bleeding conduit is arranged at least partially in said cubic capacity selection member and communicates with said inner conduit of the shuttle valve, whereby the bleeding conduit is connected to a fluid evacuation via a calibrated restriction.

2. The device according to claim 1,
wherein the shuttle valve comprises two inner conduits which are connected, one, in the first position of the shuttle valve, the other, in the second position of the shuttle valve, to said principal connection capable of containing the low-pressure fluid, and the bleeding conduit comprises two branches which communicate, one, in the first position of the shuttle valve, with one of the said two inner conduits of the shuttle valve, the other, in the second position of the shuttle valve, with the other of said two inner conduits of the shuttle valve.

3. A device according to claim 1 having a housing, at least two cubic capacities and a closed circuit for pressurized fluid supply, said circuit comprising a reservoir of fluid connected to said housing by an evacuation conduit, a booster pump having a suction conduit and a delivery conduit and connected to said reservoir through the suction conduit, and a heat exchange means adapted to refrigerate fluid pumped by said booster pump.

4. The device according to claim 3, wherein the bleeding conduit opens out into a housing for a motor.

5. The device according to claim 1, wherein the bleeding conduit opens out into a housing for a motor.

* * * * *